(12) United States Patent
Goyal et al.

(10) Patent No.: US 10,157,079 B2
(45) Date of Patent: Dec. 18, 2018

(54) RESOURCE ALLOCATION FOR TASKS OF UNKNOWN COMPLEXITY

(71) Applicant: International Business Machines Corporation, Armonk, NY (US)

(72) Inventors: Munish Goyal, Yorktown Heights, NY (US); Qin S. Held, Midland Park, NJ (US); Steven M. O'Brien, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 15/297,063

(22) Filed: Oct. 18, 2016

(65) Prior Publication Data

US 2018/0107508 A1    Apr. 19, 2018

(51) Int. Cl.
*G06F 9/46* (2006.01)
*G06F 9/48* (2006.01)
*G06F 9/50* (2006.01)

(52) U.S. Cl.
CPC .......... *G06F 9/4837* (2013.01); *G06F 9/4887* (2013.01); *G06F 9/5005* (2013.01)

(58) Field of Classification Search
CPC ..... G06F 9/452; G06F 9/4445; G06F 9/45529
See application file for complete search history.

(56) References Cited

U.S. PATENT DOCUMENTS

| | | | |
|---|---|---|---|
| 6,873,964 B1 | 3/2005 | Williams et al. | |
| 8,156,051 B1 | 4/2012 | Shah et al. | |
| 9,152,943 B2 | 10/2015 | Joao | |
| 2001/0049674 A1 | 12/2001 | Talib et al. | |
| 2006/0100919 A1 | 5/2006 | Levine | |
| 2008/0205283 A1* | 8/2008 | McGuffin | H04B 7/18506 370/238 |
| 2011/0040749 A1* | 2/2011 | Ceri | G06F 17/30867 707/723 |
| 2016/0212007 A1* | 7/2016 | Alatorre | G06F 9/5066 |

OTHER PUBLICATIONS

U.S. Appl. No. 14/937,005, filed Nov. 10, 2015, Automated Information Technology Resource System.

* cited by examiner

*Primary Examiner* — Camquy Truong
(74) *Attorney, Agent, or Firm* — Garg Law Firm, PLLC; Christopher K. McLane (57) ABSTRACT

For a task that has been partially executed, a residual complexity index is computed, the task being of a complexity that cannot be ascertained prior to executing the task. An evaluation is made whether the residual complexity index exceeds a cost of a resource that should be considered for allocation to the task. When the evaluation is affirmative, a priority of the task is established relative to a second task. The resource is scheduled to perform the task according to a timing, the timing being determined using the cost of the resource. The resource is allocated to the task according to the timing.

18 Claims, 5 Drawing Sheets

RESOURCE ALLOCATION FOR TASKS OF UNKNOWN COMPLEXITY

TECHNICAL FIELD

The present invention relates generally to a method, system, and computer program product for assigning a variety of resources to a variety of tasks that have a high degree of uncertainty associated with them. More particularly, the present invention relates to a method, system, and computer program product for resource allocation for a task of unknown complexity.

BACKGROUND

Tasks take a variety of forms. In some cases, a task is a workload that has to be processed on a computing platform. In some other cases, the task is a job opportunity that has to be filled using a suitable candidate.

In one case, the resource that is needed to complete the workload-type task is a computing resource. In another case, the resource that is needed to complete the recruitment-type task is a recruiter.

Regardless of the type, a task has to be planned in such a way that the task has a desired level of likelihood of completion. Regardless of the type, each resource has a cost associated with it, which adds to the cost of completing the task.

A complexity of a task is an indication of a level of difficulty in completing the task or a phase in the task. In many cases, a complexity of a task is known at the planning stage and adequate resources can be assigned to the task to ensure that the task reaches completion. For example, in a workload-type task, a history of executing similar workloads can be used to establish a complexity of the task at hand, and resources similar to those used in the historical execution of similar workloads can be assigned to the task at hand. As another example, recruiting a CEO for a company has a known level of difficulty from other companies' experience in recruiting CEOs, and therefore, a suitable recruiter can be engaged from the beginning of the search to afford the recruitment effort a desirable likelihood of success.

In many cases, the complexity of a task is unknown or undeterminable at the planning stage. A determination about the suitable types of resources to assign to the task, when to assign those resources to the task, and whether those resources will be available at that time are difficult to make. For example, in a workload-type task, a workload that has highly variant characteristics from execution to execution, or a workload that has not been processed before, or a workload whose outcome and requirements are unknown, form some example of workloads with such complexity. As an example, a workload that simulates the evolution of galaxies in a specific area of the universe can run for an amount of time that is not known a prior, can consume resources that are not identifiable a priori, or both. It is difficult to know at the planning stage of such a workload whether supercomputing resources should be assigned to the workload, when they should be assigned, and in what priority relative to other tasks demanding the supercomputing resources.

Similarly, a job specification that calls for a specific mix of skills and experience in a job candidate can be of an unknown complexity. It is difficult to determine whether assigning a recruiter to the recruitment effort is justified or needed for that specific mix, at what point in time would such assignment improve the likelihood of successful recruitment or be too late for the project that needs the skills, and what priority should the recruiter give to this job specification versus other job specifications that also demand the recruiter's attention.

SUMMARY

The illustrative embodiments provide a method, system, and computer program product. An embodiment includes a method that computes, using a processor and a memory, for a task that has been partially executed, a residual complexity index, the task being of a complexity that cannot be ascertained prior to executing the task. The embodiment evaluates whether the residual complexity index exceeds a cost of a resource that should be considered for allocation to the task. The embodiment establishes, responsive to the evaluating being affirmative, a priority of the task relative to a second task. The embodiment schedules the resource to perform the task according to a timing, the timing being determined using the cost of the resource. The embodiment allocates the resource to the task according to the timing.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Hereinafter, a "task" refers to any type of task contemplated herein, including but not limited to tasks to be executed on a data processing system unless expressly distinguished where used. Hereinafter, a "resource" refers to any type of resource contemplated herein for completion of the corresponding type of task unless expressly distinguished where used.

The illustrative embodiments recognize that for tasks that have uncertain complexity or are generally highly uncertain tasks, resource allocation for a successful completion is a difficult problem to solve. Particularly, the illustrative embodiments recognize that correct resource type identification is an important problem, and assigning an incorrect type of resource or insufficient resource to the task can lead to a failure in the performance of the task.

The illustrative embodiments recognize that even with the correct type, identifying the needed resource type and assigning a corresponding resource too early in the task execution can result in cost overrun. The illustrative embodiments also recognize that similarly, identifying a needed resource type and assigning a corresponding resource too late can result in the task still failing despite the resource expenditure.

The illustrative embodiments recognize that even with the correct type of resource identified and the correct timing of the resource identified, assigning a resource to the task without considering other demands on the resource at that time can cause another task to experience a failure. The illustrative embodiments recognize that even with the consideration of the other demands, assigning the resource without establishing the priority of the task for the resource relative to the other demands can cause a suboptimal use of the resource and potential failure of other tasks assigned to the resource.

The illustrative embodiments recognize that the presently available tools or solutions do not address these needs or provide adequate solutions for these needs. The illustrative embodiments used to describe the invention generally address and solve the above-described problems and other problems related to resource allocation for a task of unknown complexity.

An embodiment can be implemented as a software application. The application implementing an embodiment can be configured as a modification of an existing resource allocation system, as a separate application that operates in conjunction with an existing resource allocation system, a standalone application, or some combination thereof.

An embodiment analyzes a resource dynamic in a given environment. For example, in a data processing environment, for allocating resources to a workload-type task, the embodiment determines a state of the various resources—e.g., various data processing systems or parts thereof, various tasks using or demanding those resources, a degree of difficulty in obtaining or allocating those resources, and other factors that would have an impact on the allocation of those resources to the task, if needed later on. As another example, in a recruitment-type task, the embodiment determines an availability fluctuation of a desired skill set in the job market, types of recruiters available and demands on them, a degree of difficulty in obtaining a candidate with a specified talent, and other factors that would have an impact on the recruitment effort.

An embodiment determines whether the resource dynamics justify allocating a specific type of resource to the task at hand. For example, given the resource dynamics in a data processing environment, some tasks are likely to succeed when configured according to a default resource configuration for workloads. In other cases, it may be apparent from the demand and use pattern of resources in the data processing environment that a default configuration might be an under-allocation for the workload.

Similarly, given the resource dynamics in a jobs marketplace, some jobs may fill without needing a recruiter resource—such as by candidates self-applying for those job openings. In other cases, it might be apparent from the small number of resumes having the skill set required in a job specification, that a recruiter with experience in the pertinent skills might be needed.

If a specific resource allocation is not justified, or insufficient information is available to justify the allocation, an embodiment configures the task with the default configuration of resources and initializes the task with that configuration. If a specific resource allocation is justified, an embodiment allocates the specific resource to the task and initializes the task with that resource.

While the task is executing, i.e., being performed using the resources last allocated to the task, an embodiment computes a residual complexity of the task. A residual complexity of the task is a complexity of the remainder—or residual—of the task that has to be processed for a successful outcome.

To compute the residual complexity, an embodiment performs one or more of the following operations—

Task state quantification—in this operation, the embodiment estimates a task complexity at a time. For example, in recruitment use-case, the estimated task complexity is a factor of a number of competing job openings existing in the jobs marketplace at a time.

Task state estimation—in this operation, the embodiment determines a probability of completion of the task from the determined present state. For example, in the recruitment use-case, this probability would be the probability of filling an open job requisition in one time period given the current estimated number of other similar jobs in the market, age of requisition etc.

Task state prediction (Markov Chain)—in this operation, the embodiment determines the probability with which the task complexity is expected to increase or decrease in one time period. In the recruitment use-case, this is the probability of competing number of jobs increasing by N units in time period. Task state prediction is computed for several values of N.

Given the computed residual complexity of the task in progress, an embodiment determines a configuration of a resource, e.g., a resource type that is identifiable at this point in the execution of the task and is predicted to be needed to achieve a successful completion from this point in the execution. Once the desired resource or resource type is identified, the embodiment computes a cost associated with allocating the identified resource of the type to the task.

The cost of the resource can be determined in one or more of the following ways—

Stochastic Optimization—this method identifies the maximal value of allocating a resource to the task at any time given the estimated complexity, predicted change in complexity and the expected rate of completion of task. The maximal value changes over time as new observations are made and complexity is better understood. This method thus identifies the minimum resource cost at which the task has to be executed for timely completion when there are no competing tasks.

Monotone Search—this method identifies an optimal subset of tasks among the task set for which allocation of one resource each would result in maximal gain in value. The tasks for which a resource is allocated would have the computed maximal value at least greater than the cost of the resource otherwise it is loss making allocation.

An embodiment uses the stochastic optimization method alone. Another embodiment uses the monotone search method alone. Another embodiment alternates between the two methods in different iterations of the cost computations.

The residual complexity can also be translated into a cost. In other words, a cost value can be derived from the residual complexity of a task-in-progress. Some examples of cost equivalency of the residual complexity include but are not limited to a cost or penalty associated with breaching a service level agreement, and a cost or time increase in a project if a job is not fulfilled. If the residual complexity or a derivative thereof exceeds the cost of the desired resource, the embodiment concludes that allocating the resource to the task is justified.

Upon justification of the allocation, an embodiment further estimates the demand for the desired resource by tasks other than the task-in-progress. The estimated demand is for a period extending from the present time up to either an estimated completion time of the present task-in-progress, or up to a time when the task-in-progress is expected to reach a phase where the desired resource can be deallocated from the task-in-progress.

Based on the estimated demand, and the expected or actual other tasks competing for the resource, an embodiment computes a relative priority of the task-in-progress. The relative priority of the task-in-progress is relative to the other expected or actual tasks that are competing for the desired resource.

The embodiment allocates the desired resource to the task-in-progress while specifying the priority of processing the task-in-progress while using the resource. In other words, the resource is expected to only be available in an amount—measured by time for which the resource is available to the task or other suitable method of measuring the amount—that is proportional to the relative priority of the task.

From time to time, an embodiment recomputes the residual complexity of the task-in-progress, adjusts a type of resource, an allocation of the resource, a duration of the allocation, a relative priority of the task-in-progress, or some combination thereof to continue to advance the task towards a successful completion. In some cases, the residual complexity may not only increase but also decline as the task progresses. Accordingly, the embodiment may not only allocate resources but also reduce an allocation or deallocate a resource as may be justified by the residual complexity at the time.

The manner of resource allocation for a task of unknown complexity described herein is unavailable in the presently available methods. A method of an embodiment described herein, when implemented to execute on a device or data processing system, comprises substantial advancement of the functionality of that device or data processing system in managing the resource allocation to highly uncertain tasks or to tasks with uncertain complexity such that the tasks progress to completion without incurring unnecessary costs or adversely influencing other tasks.

The illustrative embodiments are described with respect to certain types of tasks, resources, complexities, uncertainties, periods, costs, methods of computing costs, methods of computing a residual complexity, allocations, priorities, dynamics, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
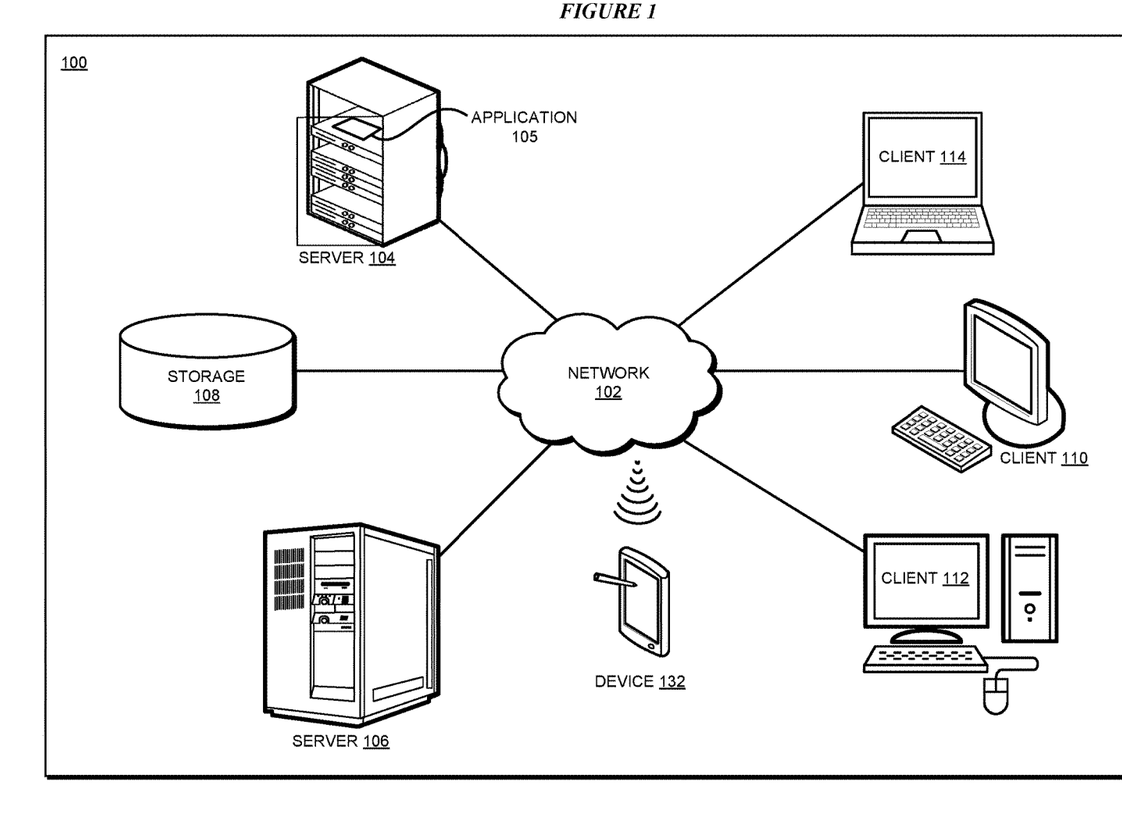
FIG. 1 depicts a block diagram of a network of data processing systems in which illustrative embodiments may be implemented.
Figure 2:
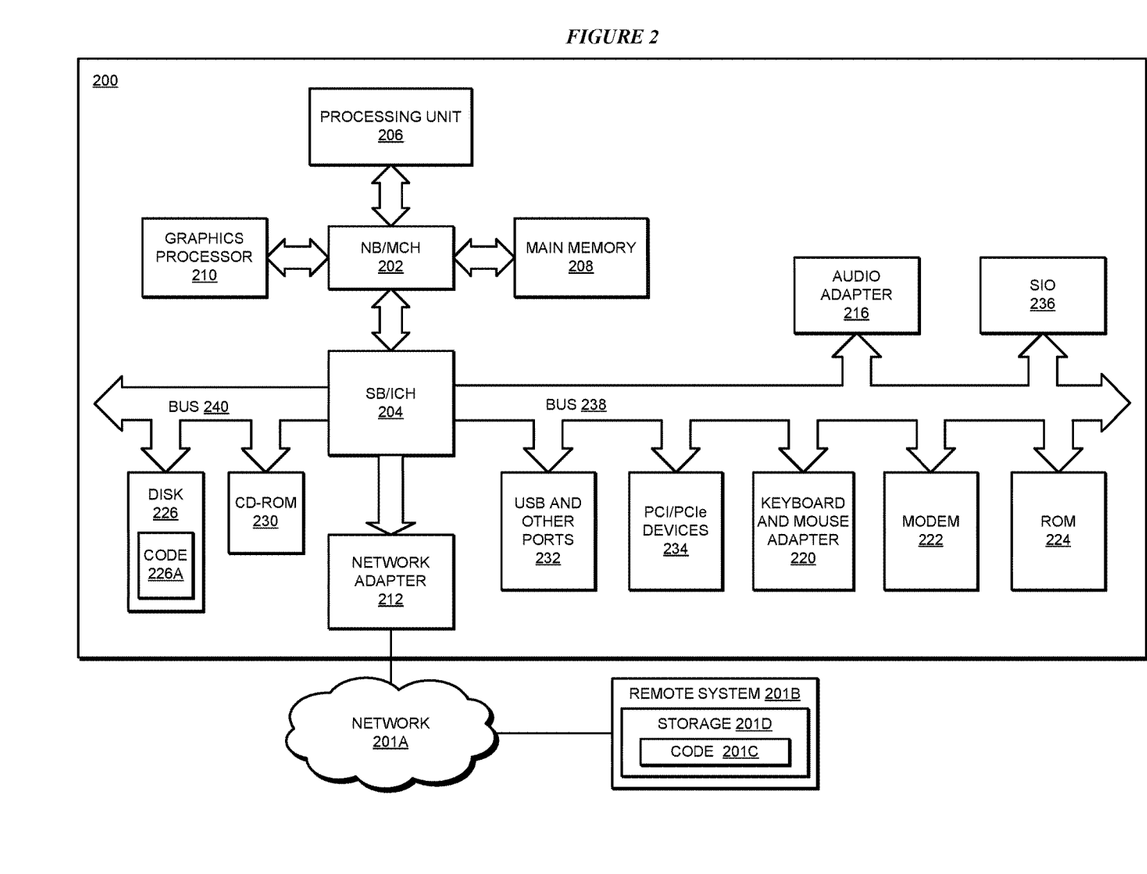
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment.

For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
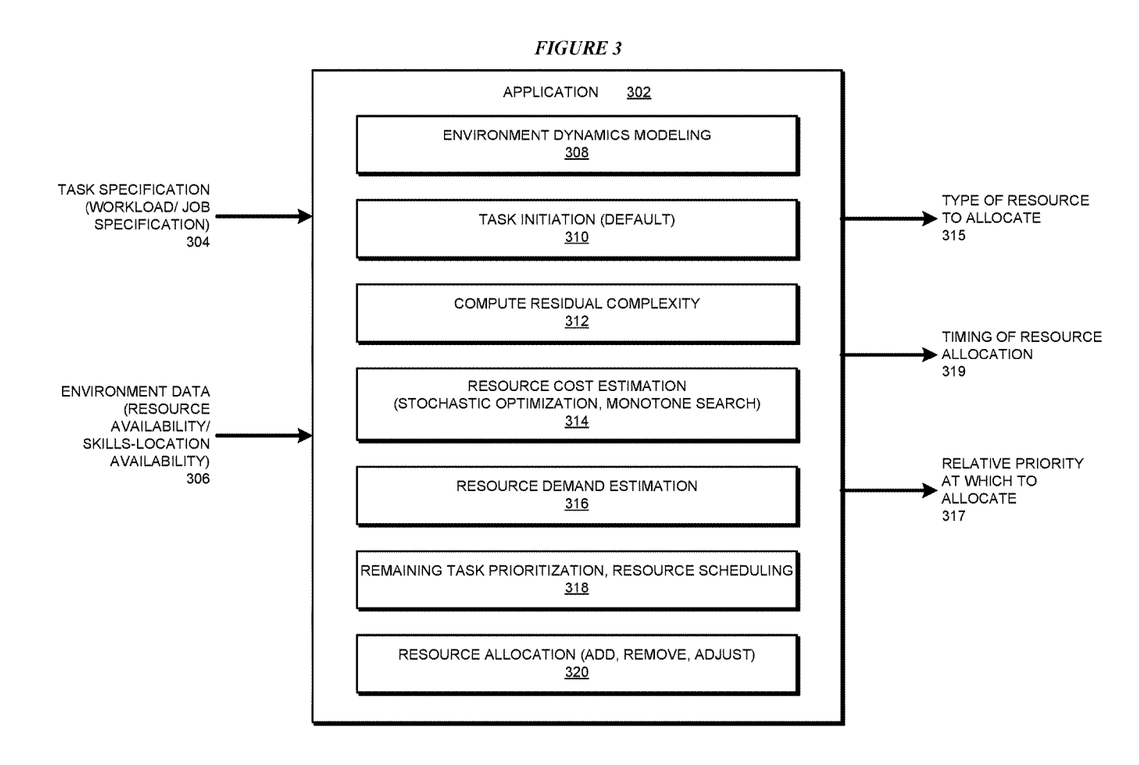
FIG. 3 depicts a block diagram of an example configuration for resource allocation for a task of unknown complexity in accordance with an illustrative embodiment.

With reference to FIG. 3, this figure depicts a block diagram of an example configuration for resource allocation for a task of unknown complexity in accordance with an illustrative embodiment. Application 302 is an example of application 105 in FIG. 1.

Task specification 304 is an input to application 302. Task specification 304 may be a specification of a workload-type task or a job-specification for a recruitment-type task as described herein. Environment data 306 is another input to application 302. Environment data 306 includes information about resource usage and/or availability, resource demand forecast, competing task predictions, and the like, for workload-type tasks. Environment data 306 includes the availability of certain skills in certain locations, and other such data that are indicative of conditions in the job marketplace for recruitment-type tasks.

Component 308 models an environment's dynamics using environment data 306 as described herein. Component 310 initiates the task specified by input task specification 304, such as in a default configuration. In a workload-type task, initiation in a default configuration may mean that the task according to task specification 304 is configured to execute with a predetermined set of resources. In a recruitment-type task, initiation in a default configuration may mean that job specification 304 is made available for candidates to respond without the involvement of a recruiter, or a with a predetermined level of recruiter involvement.

At some point during the execution of the task after the task initiation, component 312 computes a residual complexity of the task, as described herein. Using the insight gained into the task due to the partial execution of the task, component 314 determines or forecasts a type of resource that will be needed to complete the task successfully within task specification 304. Optionally, the determined type of resource can be produced as output 315 for use by another system. Component 314 estimates the cost of a resource of the type for completing the task, e.g., by using stochastic optimization, monotone search, or a combination thereof.

Component 316 estimates other demand on the resource. Using the cost determined by component 316 and the demand estimated by component 316, component 318 prioritizes the remaining portion of the partially executed task relative to the other forecasted or actual demand for the resource. Optionally, the determined relative priority of the task can be produced as output 317 for use by another system.

Component 318 schedules the resource according to the priority and cost related timing consideration, as described herein. Optionally, the determined timing of resource allocation can be produced as output 319 for use by another system. Component 320 allocates the resource, or adjusts the allocation of the resource to the task according to the scheduling produced by component 316.

Figure 4:
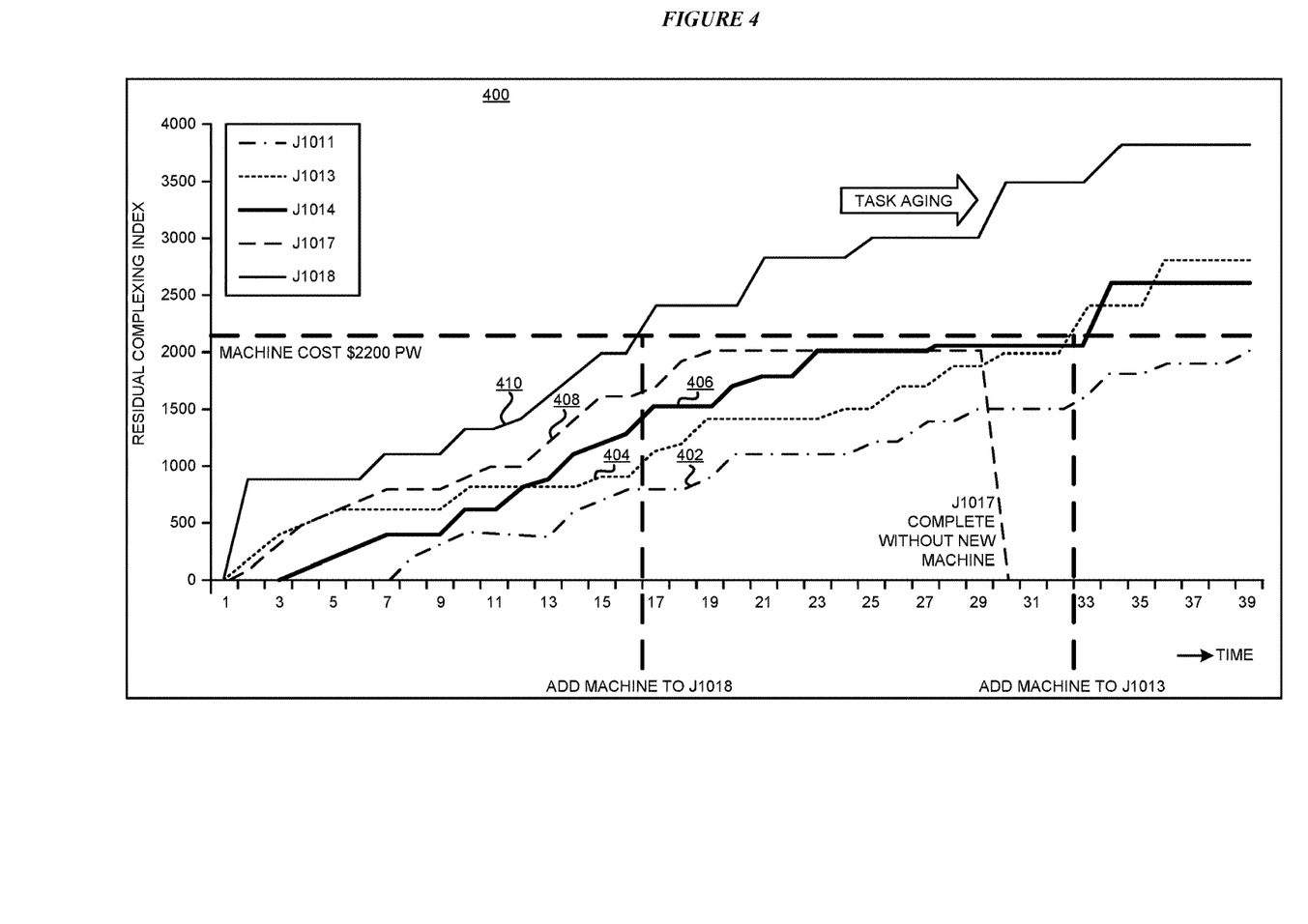
FIG. 4 depicts a graph of an example resource allocation in accordance with an illustrative embodiment.

With reference to FIG. 4, this figure depicts a graph of an example resource allocation in accordance with an illustrative embodiment. Application 302 can perform the resource allocation as depicted in graph 400.

Graph 400 shows the allocation strategy used in application 302, when several tasks are competing for a resource. Only as an overly simplified example and without implying any limitations thereto on the illustrative embodiments, consider that the resource is a single resource called "machine", which has a cost of 2200 Dollars per unit of consumption. The tasks competing for the machine are task labeled "J1011", task labeled "J1013", task labeled "J1014", task labeled "J1017", and task labeled "J1018".

Graph 400 plots changes in residual complexities of tasks J1011-J1018, where the residual complexities have been converted to a cost index on a scale comparable to the cost of the machine. The competing tasks age, or progress in their execution, from time T0 to T1 to T2 to T3 and so on. Graph 402 corresponds to the changes in the residual complexity index of task J1011; graph 404 corresponds to the changes in the residual complexity index of task J1013; graph 406 corresponds to the changes in the residual complexity index of task J1014; graph 408 corresponds to the changes in the residual complexity index of task J1017; and graph 410 corresponds to the changes in the residual complexity index of task J1018.

At approximately time T17, the residual complexity index of graph 410 crosses or exceeds the cost of the machine. Accordingly, the machine is scheduled for allocation to task J1018 at or around time T17 depending on the considerations described herein. The residual complexity of task J1017 never exceeds the cost of the resource, according to graph 408, and the machine is never allocated to task J1017. Accordingly, task J1017 executes in a default configuration. At approximately time T30, task J1017 completes successfully executing using the default configuration.

At approximately time T33, the residual complexity index of graph 404 crosses or exceeds the cost of the machine. Accordingly, the machine is scheduled for allocation to task J1013 at or around time T33 depending on the considerations described herein. Other tasks age as depicted by their graphs and either become justifiable for the allocation of the machine or continue in their previous configurations.

Figure 5:
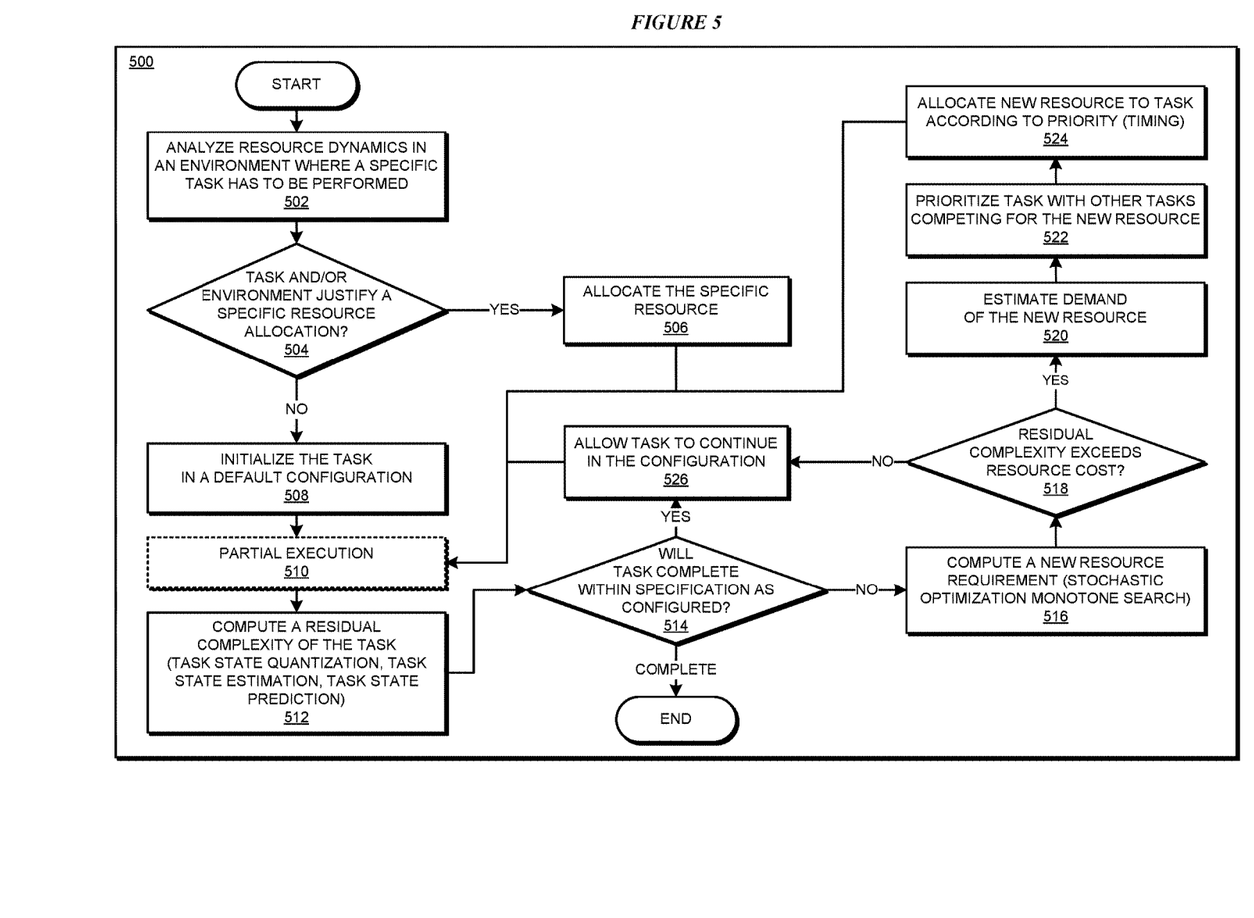
FIG. 5 depicts a flowchart of an example process for resource allocation for a task of unknown complexity in accordance with an illustrative embodiment.

With reference to FIG. 5, this figure depicts a flowchart of an example process for resource allocation for a task of unknown complexity in accordance with an illustrative embodiment. Process 500 can be implemented in application 302 in FIG. 3.

The application analyzes the resource dynamics in a given environment where a specific task has to be performed (block 502). The application determines whether the task and/or the resource dynamics in the environment justify allocating a specific resource to the task (block 504). If the resource allocation is justified ("Yes" path of block 504), the application enables an allocation of the specific resource to the task (block 506). Process 500 then proceeds to block 510.

If a specific resource allocation is not justified ("No" path of block 504), the application initializes the task using a default configuration (block 508). The application allows partial execution of the task to occur (block 510).

After a partial execution of the task, the application computes a residual complexity index of the task (block 508). The application determines whether the task will complete within the task specification by executing as presently configured (block 514). If the task has already completed ("Complete" path of block 514), the application ends process 500 thereafter.

If the task is likely to complete within the task specification by executing as presently configured ("Yes" path of block 514), the application allows the task to continue in the present configuration (block 526). The application thereafter returns to block 510.

If the task is unlikely complete within the task specification by executing as presently configured ("No" path of block 514), the application computes a new resource requirement for the task, i.e., a type of resource that is needed to increase the likelihood that the task will complete successfully within the specification (block 516).

The application determines whether the residual complexity index of the task exceeds the resource cost estimate (block 518). If the residual complexity index of the task does not exceed the resource cost estimate ("No" path of block 518), the application proceeds to block 526 and allows the task to continue in the present configuration.

If the residual complexity index of the task exceeds the resource cost estimate ("Yes" path of block 518), the application estimates other demands on the resource (block 520). The application prioritizes the task with the other tasks that are expected to be competing for the resource when the resource is expected to be allocated to the task (block 522). The application allocates the resource to the task according to an allocation schedule or timing (block 524).

The application then returns process 500 to block 510. When the task completes, the application causes process 500 to exit through the "Complete" path of block 514 and end thereafter.

Thus, a computer implemented method, system or apparatus, and computer program product are provided in the illustrative embodiments for resource allocation for a task of unknown complexity and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   computing, using a processor and a memory, for a task that has been partially executed, a residual complexity index, the task being of a complexity that cannot be ascertained prior to executing the task;
   evaluating whether the residual complexity index exceeds a cost of a resource that should be considered for allocation to the task;
   establishing, responsive to the evaluating being affirmative, a priority of the task relative to a second task;
   scheduling the resource to perform the task according to a timing, the timing being determined using the cost of the resource, wherein the cost of the resource is determined by
      computing the cost of the resource in a first iteration, wherein the first iteration uses a stochastic optimization to determine a period during which the cost of the resource for any task is below a first threshold; and
      computing the cost of the resource in a second iteration, wherein the second iteration uses a monotone search to determine a period during which the cost of the resource for use with the task is below a second threshold; and
   allocating the resource to the task according to the timing.

2. The method of claim 1, wherein the timing is further determined using the priority.

3. The method of claim 1, wherein the second task is forecasted to have a demand for the resource during the period.

4. The method of claim 1, further comprising:
   converting, as a part of the evaluating, the residual complexity index to a cost value, the cost value corresponding to the residual complexity index being on a scale of the cost of the resource.

5. The method of claim 1, further comprising:
computing the cost of the resource, wherein the computing uses a stochastic optimization to determine a period during which the cost of the resource for any task is below a threshold.

6. The method of claim 1, further comprising:
computing the cost of the resource, wherein the computing uses a monotone search to determine a period during which the cost of the resource for use with the task is below a threshold.

7. The method of claim 1, further comprising:
determining, responsive to a complexity exhibited by the partial execution of the task, that the resource should be considered for allocation to the task.

8. The computer usable program product of claim 7, further comprising:
program instructions to compute the cost of the resource, wherein the computing uses a stochastic optimization to determine a period during which the cost of the resource for any task is below a threshold.

9. The computer usable program product of claim 7, further comprising:
program instructions to compute the cost of the resource, wherein the computing uses a monotone search to determine a period during which the cost of the resource for use with the task is below a threshold.

10. A computer usable program product comprising one or more computer-readable storage devices, and program instructions stored on at least one of the one or more storage devices, the stored program instructions comprising:
program instructions to compute, using a processor and a memory, for a task that has been partially executed, a residual complexity index, the task being of a complexity that cannot be ascertained prior to executing the task;
program instructions to evaluate whether the residual complexity index exceeds a cost of a resource that should be considered for allocation to the task;
program instructions to establish, responsive to the evaluating being affirmative, a priority of the task relative to a second task;
program instructions to schedule the resource to perform the task according to a timing, the timing being determined using the cost of the resource, wherein the cost of the resource is determined by
program instructions to compute the cost of the resource in a first iteration, wherein the first iteration uses a stochastic optimization to determine a period during which the cost of the resource for any task is below a first threshold; and
program instructions to comput the cost of the resource in a second iteration, wherein the second iteration uses a monotone search to determine a period during which the cost of the resource for use with the task is below a second threshold; and
program instructions to allocate the resource to the task according to the timing.

11. The computer usable program product of claim 10, wherein the timing is further determined using the priority.

12. The computer usable program product of claim 10, wherein the second task is forecasted to have a demand for the resource during the period.

13. The computer usable program product of claim 10, further comprising:
program instructions to convert, as a part of the evaluating, the residual complexity index to a cost value, the cost value corresponding to the residual complexity index being on a scale of the cost of the resource.

14. The computer usable program product of claim 10, further comprising:
program instructions to determine, responsive to a complexity exhibited by the partial execution of the task, that the resource should be considered for allocation to the task.

15. The computer usable program product of claim 10, wherein the computer usable code is stored in a computer readable storage device in a data processing system, and wherein the computer usable code is transferred over a network from a remote data processing system.

16. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to compute for a task that has been partially executed, a residual complexity index, the task being of a complexity that cannot be ascertained prior to executing the task;
program instructions to evaluate whether the residual complexity index exceeds a cost of a resource that should be considered for allocation to the task;
program instructions to establish, responsive to the evaluating being affirmative, a priority of the task relative to a second task;
program instructions to schedule the resource to perform the task according to a timing, the timing being determined using the cost of the resource, wherein the cost of the resource is determined by
program instructions to compute the cost of the resource in a first iteration, wherein the first iteration uses a stochastic optimization to determine a period during which the cost of the resource for any task is below a first threshold; and
program instructions to comput the cost of the resource in a second iteration, wherein the second iteration uses a monotone search to determine a period during which the cost of the resource for use with the task is below a second threshold; and
program instructions to allocate the resource to the task according to the timing.

18. The computer system of claim 17, wherein the timing is further determined using the priority.

* * * * *